| (12) | United States Patent<br>Ermantraut et al. | (10) Patent No.: US 12,251,695 B2<br>(45) Date of Patent: Mar. 18, 2025 |
|---|---|---|

(54) LIQUID HANDLING AND PROCESSING TOOL FOR ANALYZING A BIOLOGICAL SAMPLE

(71) Applicant: BLINK AG, Jena (DE)

(72) Inventors: Eugen Ermantraut, Jena (DE); Alrik Wolff, Weimar (DE)

(73) Assignee: BLINK AG, Jena (DE)

( * ) Notice: Subject to any disclaimer, the term of this patent is extended or adjusted under 35 U.S.C. 154(b) by 606 days.

(21) Appl. No.: 17/623,950

(22) PCT Filed: Jul. 17, 2020

(86) PCT No.: PCT/EP2020/070359
§ 371 (c)(1),
(2) Date: Dec. 30, 2021

(87) PCT Pub. No.: WO2021/009373
PCT Pub. Date: Jan. 21, 2021

(65) Prior Publication Data
US 2022/0362760 A1 Nov. 17, 2022

(30) Foreign Application Priority Data
Jul. 18, 2019 (EP) .................................. 19187064

(51) Int. Cl.
*B01L 3/00* (2006.01)
*G01N 35/10* (2006.01)

(52) U.S. Cl.
CPC .................. *B01L 3/502* (2013.01); *B01L 3/00* (2013.01); *G01N 35/10* (2013.01); *B01L 2200/0684* (2013.01); *B01L 2200/0689* (2013.01); *B01L 2200/16* (2013.01); *B01L 2300/0864* (2013.01); *B01L 2400/0478* (2013.01); *B01L 2400/0644* (2013.01)

(58) Field of Classification Search
CPC ............. B01L 3/502; B01L 2200/0684; B01L 2200/0689; B01L 2200/16; B01L 2300/0864; B01L 2400/0478; B01L 2400/0644; B01L 3/502738; B01L 2200/026; B01L 3/502715; B01L 2200/027; B01L 2300/0681; B01L 2300/0832; B01L 2300/0867; G01N 35/1097
See application file for complete search history.

(56) References Cited

U.S. PATENT DOCUMENTS

| 6,374,684 | B1 * | 4/2002 | Dority ..................... B01L 3/502 |
| | | | 73/864.81 |
| 6,818,185 | B1 * | 11/2004 | Petersen ................. B01L 3/502 |
| | | | 435/287.7 |
| 2010/0255473 | A1 | 10/2010 | Ermantraut et al. |
| 2016/0305972 | A1 * | 10/2016 | Ogg ...................... C12Q 1/6888 |
| 2018/0280975 | A1 * | 10/2018 | Kilcoin ............. B01L 3/502738 |

FOREIGN PATENT DOCUMENTS

| EP | 3153837 A1 | 4/2017 |
| KR | 101 683 437 B1 | 12/2016 |

* cited by examiner

*Primary Examiner* — Jennifer Wecker
*Assistant Examiner* — Britney N. Washington
(74) *Attorney, Agent, or Firm* — SALIWANCHIK, LLOYD & EISENSCHENK

(57) ABSTRACT

The present invention relates to a liquid handling and processing tool for analyzing a biological sample. Furthermore, the present invention relates to a fluid processing and detection module for processing a liquid sample and for detecting analyte in the sample.

20 Claims, 10 Drawing Sheets section B-B top view

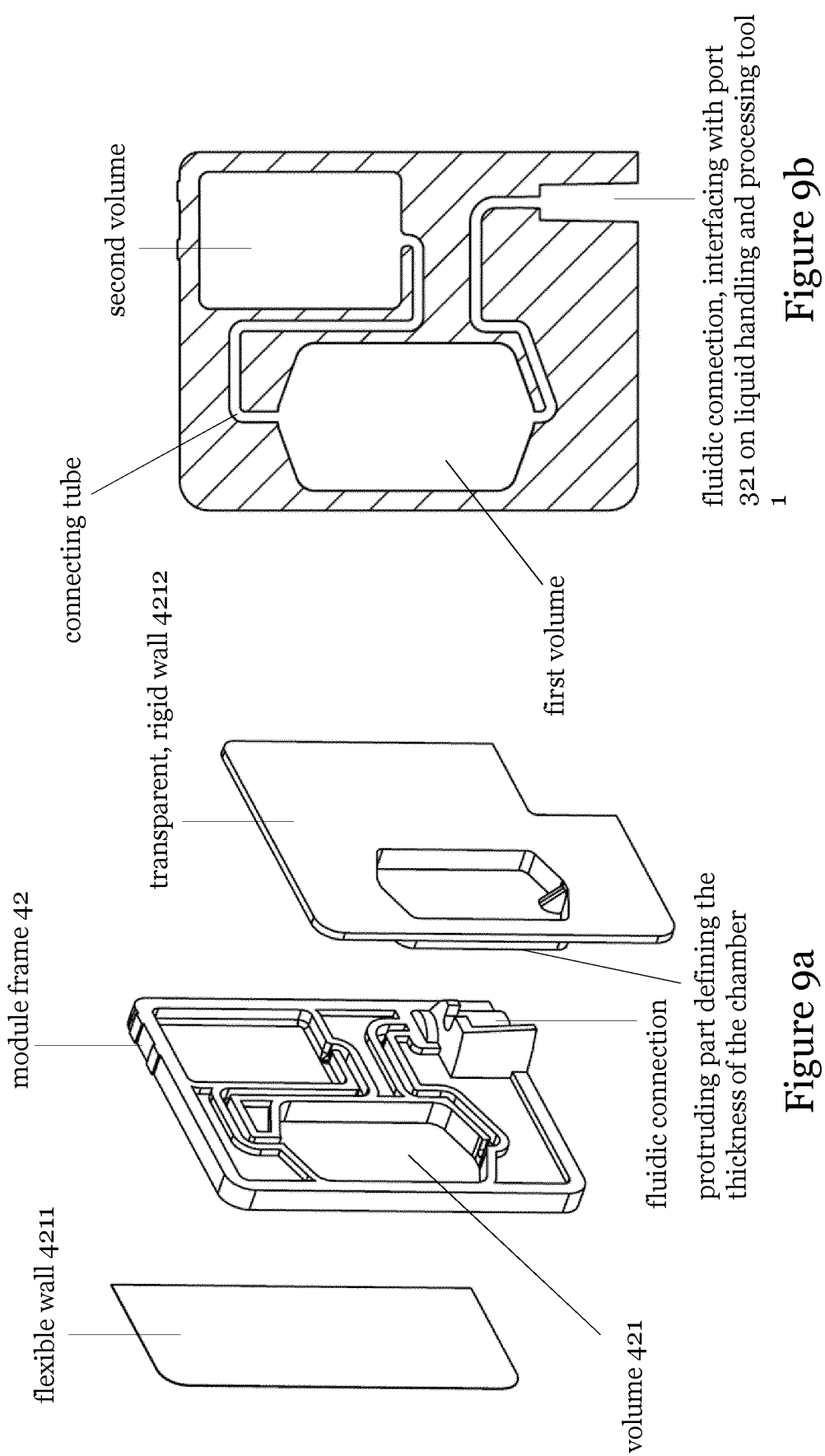

LIQUID HANDLING AND PROCESSING TOOL FOR ANALYZING A BIOLOGICAL SAMPLE

CROSS REFERENCE TO RELATED APPLICATIONS

This application is a National Stage Application of International Application Number PCT/EP2020/070359, filed Jul. 17, 2020; which claims priority to European Application No. 19187064.1, filed Jul. 18, 2019.

The present invention relates to a liquid handling and processing tool for analyzing a biological sample. Furthermore, the present invention relates to a fluid processing and detection module for processing a liquid sample and for detecting analyte in the sample.

The need for safe operation and performance of bioanalytical assays has led to the development of integrated cartridge-based tests. Typically, such cartridges contain all the reagents required to perform the respective test and provide compartments for performing dedicated processing and detection steps. In recent years, disposable cartridges have been developed for conducting analysis of biological samples for various diagnostic and monitoring purposes. One aspect of cartridge-based testing is that the entire process is self-contained. At no time, the sample or the reagents will come into contact with the instrument that is used to process the cartridge. An early basic design of a liquid handling cartridge is outlined in U.S. Pat. No. 4,231,990. A basic architecture of arranging valves around a centrally located fluid displacement unit and a single fluid sample processing chamber is disclosed in WO 02/18902 A1. WO 03/072253 A1 describes a cartridge according to the basic design of WO 02/18902 A1, with additional sample processing means being accommodated in one of the chambers in its housing. The references do not, however, outline in detail how a safe operation of the system can be ensured without contaminating the reagents and devices accommodated in the respective chambers. U.S. Pat. No. 9,394,086 describes a lid to seal such devices of WO 02/18902 A1 and WO 03/072253 A1. The lid of U.S. Pat. No. 9,394,086 seals all chambers during transport. Before use, the lid is opened and the sealing is irreversibly broken and removed and the cartridge is no longer sealed anymore. It can therefore only be operated in an upright position. After breaking of the seal, the cartridge may leak if dropped or tripped over. Once filled, the respective cartridge is difficult to transport or handle because of the respective compartments essentially having been opened to be filled with the necessary reagents.

The present invention is aimed at avoiding or overcoming the disadvantages associated with the prior art.

In a first aspect, the present invention relates to a liquid handling and processing tool (1) for analyzing a biological sample, said tool comprising:
a valve body (2) including a fluid displacement chamber (21), said fluid displacement chamber having a top (211) and a bottom (212), and an opening at said top (2111) and said bottom (2121), respectively; said fluid displacement chamber allowing to draw liquid and expel liquid therefrom; the valve body further including a first sealing plate (2112) at the top and a second sealing plate (2121) at the bottom; wherein said first sealing plate at the top and said second sealing plate at the bottom are fixedly coupled to each other via said fluid displacement chamber and wherein each of the first and second sealing plates has a port (21121, 21211); the fluid displacement chamber being in fluidic connection with the port of the second sealing plate via a channel (21212) in said second sealing plate, said channel extending from said opening (2121) of said fluid displacement chamber at said bottom and ending in said port (21211) of said second sealing plate;
a housing (3) having a plurality of chambers (31, 31', 31", 31''') for holding reagent(s) or receiving liquid(s), each of said chambers having a top (311) and a bottom (312), respectively; a fluidic port (3121) in said bottom, and, optionally, a venting port (3111) in said top; said housing further including at least one interface (32) for fluidically connecting a separate fluid processing module to said housing, said at least one interface comprising a single port (321);
wherein said valve body and the housing are arranged in such a manner that said fluid displacement chamber is located within said housing, the valve body is rotatable within said housing, wherein said first sealing plate seals said plurality of chambers at their respective tops, the second sealing plate seals said plurality of chambers at their respective bottoms; and the valve body is configured to establish, via said channel and via the port of said second sealing plate, a single fluidic connection from said fluid displacement chamber to a selected chamber of the plurality of chambers, and, optionally, to allow the concomitant venting of the same or another chamber via said port of said first sealing plate; or the valve body is configured to establish, via said channel and via the port of said second sealing plate, a single fluidic connection from said fluid displacement chamber to said at least one interface and, if present, any separate fluid processing module attached to such interface.

In a further aspect, the present invention relates to a liquid handling and processing tool (1) for analyzing a biological sample, in particular a liquid handling and processing tool as described in the previous paragraphs, said tool comprising:
a valve body (2) having a longitudinal axis and including, along its longitudinal axis, a fluid displacement chamber (21), said fluid displacement chamber having a top (211) and a bottom (212), and an opening at said top (2111) and said bottom (2121), respectively;
said fluid displacement chamber further having a piston (213) that is movable within said fluid displacement chamber and that allows to draw liquid to and expel liquid from said fluid displacement chamber;
said fluid displacement chamber being centrally located within said valve body and aligned along said longitudinal axis of said valve body;
said valve body (2) further including a first circular sealing plate (2112) located at the top of the fluid displacement chamber, and a second circular sealing plate (2121) located at the bottom of the fluid displacement chamber;
said first circular sealing plate (2112) being fixedly connected to said valve body at the top of the fluid displacement chamber and having a venting port (21121) located off-centre of said first circular sealing plate, said first circular sealing plate allowing access to said opening (2111) of said fluid displacement chamber at said top by means of an opening (21122), preferably a central opening, within said first circular sealing plate that is aligned with said opening (2111) at said top of said fluid displacement chamber;
said second circular sealing plate (2121) being fixedly connected to said valve body at the bottom of the fluid displacement chamber and having a fluidic port (21211) located off-centre of said second circular sealing plate, said second circular sealing plate allowing access to said opening (2121) of said fluid displacement chamber at said bottom by means of an opening (21213), preferably a central opening, within said second circular sealing plate that is aligned with said opening (2121) at said bottom of said fluid displacement chamber;
said venting port (21121) of said first circular sealing plate and said fluidic port (21211) of said second circular sealing plate being aligned with each other;
said second circular sealing plate further having a channel (21212) extending radially from said opening (21213) within said second circular sealing plate and ending in said fluidic port (21211) located off-centre of said second circular sealing plate; said valve body thus being configured to establish, via said channel, a single fluidic connection with said fluidic port located off-centre of said second circular sealing plate;
a housing (3) including a plurality of chambers (31, 31', 31", 31''') for holding reagent(s) or receiving liquid(s), said chambers being arranged around a central hollow space, each of said chambers having a top (311) and a bottom (312), respectively; a fluidic port (3121) in said bottom and, optionally, a venting port (3111) in said top; said housing further including at least one interface (32) for fluidically connecting a separate fluid processing module to said housing, said at least one interface comprising a single port (321);
wherein the valve body and the housing are arranged in such a manner that said fluid displacement chamber is located within said central hollow space, the valve body is rotatable within said central hollow space around said longitudinal axis, the first circular sealing plate of said valve body seals said plurality of chambers at their respective tops, the second circular sealing plate of said valve body seals said plurality of chambers at their respective bottoms; and the valve body is configured to establish, via said channel and via the fluidic port in the bottom of said second circular sealing plate, a single fluidic connection from said fluid displacement chamber to a selected chamber of the plurality of chambers, and, optionally, to allow the concomitant venting of the same or another chamber via the venting port of said first circular sealing plate; or the valve body is configured to establish a single fluidic connection, via said channel and via the fluidic port in the bottom of said second circular sealing plate, from said fluid displacement chamber to said at least one interface and, if present, any separate fluid processing module attached to such interface.

In one embodiment, the ports of said first sealing plate and said second sealing plate are aligned with each other along a longitudinal axis of said valve body.

In one embodiment, at least one chamber of said plurality of chambers has a venting port (3111) at its top, wherein, preferably, each of said plurality of chambers has a venting port at its respective top.

In one embodiment, said plurality of chambers are closed at the top by a single lid (313) in which any venting port(s) (3111), if present, is (are) located.

In one embodiment, at least one chamber of said plurality of chambers further has a loading port (3112) for adding liquids to said chamber, said loading port being located at the top of said at least one chamber, wherein said loading port is different from said venting port, if present.

In one embodiment, several chambers, preferably all chambers of said plurality of chambers, each have a loading port (3112) for adding liquids to the respective chamber, said loading ports being located at the top of the respective chamber(s), said loading ports being different from any venting port(s), if present.

In one embodiment, said loading port(s) is (are) located in the single lid (313).

In one embodiment, said housing includes several interfaces (32, 32', 32") for fluidically connecting a separate fluid processing module to said housing, each of said several interfaces comprising a single port (321, 321', 321''').

In one embodiment, at least one chamber is a compartmentalized chamber having different compartments (314, 314', 314") which are in fluidic connection with each other, such compartments being configured to perform different functions, such as filtering, acting as a reservoir for processing fluids or acting as an overflow volume; or wherein at least two chambers of said plurality of chambers are in fluidic connection with each other, with each of such at least two chambers being configured to perform different functions, such as filtering, acting as a reservoir for processing fluids or acting as an overflow volume, wherein preferably said at least two chambers being in fluidic connection with each other, each have a fluidic port in the bottom and a venting port in the top.

In one embodiment, said channel (21212) has no other openings than the opening of said fluid displacement chamber (2121) at the bottom and said port (21211) of said second sealing plate, but is otherwise a closed channel.

In one embodiment, said single port of said at least one interface for fluidically connecting a fluid processing module to said housing, is not part of any of said plurality of chambers and is configured to allow the attachment of a fluid processing module or other module from outside to the housing.

In one embodiment, sealing of said plurality of chambers by said first and second sealing plates is achieved by employing suitable sealing material(s) placed between the respective plate(s) and the housing, and/or by lining said first and second sealing plates and/or the housing with such suitable sealing materials, and/or by configuring said first and second sealing plates and the housing such that the respective sealing plates are pressed against the housing with a force that is sufficient to seal said plurality of chambers, wherein, preferably, said suitable sealing material(s) is(are) selected from elastic materials, thermoplastic materials and other plastic materials.

In one embodiment, said channel in said second plate is configured to be interrogated with any of:
an optical setup capable of detecting the presence, volume and/or optical properties, such as visible colour, fluorescence, extinction, of any fluid in the channel.
a pressure sensor to determine the pressure within said liquid handling and processing tool, preferably within said channel.

In one embodiment, said optical setup is a reflective optical setup, such as a light barrier, and/or the pressure sensor is a piezo-based pressure sensor.

In one embodiment, the liquid handling and processing tool further comprises at least one fluid processing module (4) that is attached to said at least one interface (32) via said single port (321) of said at least one interface or, if present, to several such interfaces (32, 32', 32").

In one embodiment, said fluid processing module is a module configured for performing a nucleic acid amplification reaction, a module configured for concentrating or purifying an analyte of interest, such as a nucleic acid, or is a module for disrupting, homogenizing and/or lysing a biological sample.

In one embodiment, said fluid processing module (4) is a module configured for performing a nucleic acid amplification reaction, and wherein said nucleic acid amplification module has an opening (41) by which it is fluidically connected to said single port (321) of said interface, wherein, preferably, said opening is the only opening of said fluid processing module.

In one embodiment, said fluid processing module comprises a frame (42) encompassing a volume (421) having at least one wall that (4211) is flexible and conformable to an external temperature regulating surface.

In one embodiment, said fluid processing module further comprises a rigid wall region (4212) that is transparent or otherwise amenable to optical interrogation by means of an external optical sensor, such that said fluid processing module is configured to allow detection of a content within said fluid processing module.

In one embodiment, said fluid processing module has a bipartite volume consisting of a first part and a second part, wherein the first part is a first volume directly connected and in communication with said opening of said fluid processing module, wherein in said first volume, processing of sample and, optionally, detection of a processing reaction takes place, and wherein the second part is a second volume that is only connected to said first part via a connecting tube, but is an otherwise closed volume, wherein said second volume is a volume for receiving overflow of liquid or gas from the first part and for acting as a pressure reservoir.

In one embodiment, said first volume has two opposing walls, one of which is formed by said flexible wall (4211), as defined further above, or a part thereof, and the other of which is formed by said rigid wall region (4212), as defined further above, or a part thereof.

In one embodiment, at least one chamber of said plurality of chambers has an external wall (315) accessible from the outside of said housing, wherein said external wall is configured to be contacted by a temperature regulating device, thus allowing temperature control within said at least one chamber, if a temperature regulating device does contact said external wall.

In a further aspect, the present invention also relates to a fluid processing and detection module (4) for processing a liquid sample and for detecting an analyte in said sample, configured to be used in conjunction with a liquid handling and processing tool (1) as defined further above, and configured to be attached to said at least one interface (32) of said liquid handling and processing tool via said single port (321) of said at least one interface, wherein said fluid processing module comprises:

a frame (42) encompassing a volume (421) having at least one wall (4211) that is flexible and conformable to an external temperature regulating surface;

a rigid wall region (4212) that is transparent or otherwise amenable to optical interrogation by means of an external optical sensor;

an opening (41) by which said fluid processing and detection module is fluidically connectable to said single port (321) of said interface (32) of said liquid handling and processing tool, wherein, preferably, said opening of said fluid processing and detection module is the only opening of said module.

In one embodiment, the fluid processing and detection module according to the present invention comprises a bipartite volume consisting of a first part and a second part, wherein the first part is a first volume directly connected and in communication with said opening of said fluid processing and detection module, wherein in said first part, processing of sample and detection of any processing reaction takes place, and wherein the second part is a second volume connected only to said first part via a connecting tube, but being otherwise a closed volume, wherein said second part is a volume for receiving overflow of liquid or gas from the first part and for acting as a pressure reservoir.

In one embodiment, said first volume has two opposing walls, one of which is formed by said flexible wall (4211), as defined further above, or a part thereof, and the other of which is formed by said rigid wall region (4212), as defined further above, or a part thereof.

The present inventors have devised a device which is a cartridge for analyzing a biological sample which is ready-to-fill and which, even after having been filled, can be easily handled and manipulated, without any danger of cross contamination between different reagents, liquids or compartments, due to the modular structure of the device. More particularly, the individual compartments or chambers within the liquid handling and processing tool are isolated from each other, unless otherwise specified. In one embodiment, the chambers of said plurality of chambers for holding reagents or receiving liquids are chambers that are closed, but for the presence of a fluidic port in the bottom, optionally a venting port in the top and, further optionally, a loading port at the top of the respective chamber. Unless being addressed by the respective port in the corresponding sealing plate, i. e. the second sealing plate at the bottom and the first sealing plate at the top, the respective fluidic port in the bottom and the respective venting port in the top, if present, are closed. Moreover, if a chamber has an additional loading port in the top, this is configured such that it can be sealed again after use, i. e. after a liquid, reagent, or sample has been added to the respective chamber. By having the individual chambers being isolated from each other, and by the respective chambers being effectively closed chambers, the liquid handling and processing tool according to the present invention enables a handling and processing of liquids that is essentially devoid of any risk of cross contamination. Moreover, the liquid handling and processing tool according to the present invention does not run the risk of leaking or losing any liquid, even if it is turned upside down or otherwise dislocated from its usual upright position.

In accordance with the first aspect, the liquid handling and processing tool for analyzing a biological sample comprises a valve body. Such valve body allows the specific and targeted establishment of a fluid connection from a fluid displacement chamber within the valve body, to one of the chambers within a plurality of chambers within the liquid handling and processing tool. The fluid displacement chamber has a top and a bottom, and an opening at said top and said bottom, respectively. It allows to draw liquid and expel liquid from the fluid displacement chamber. Furthermore, the valve body further includes a first sealing plate at the top and a second sealing plate at the bottom. The two sealing plates are fixedly coupled to each other via the fluid displacement chamber, and each of the first and second sealing plates has a port. The fluid displacement chamber is in fluidic connection with the port of the second sealing plate at the bottom via a channel which is in the second sealing plate. This channel extends from the opening of the fluid displacement chamber at the bottom and ends in the port of the second sealing plate. This channel typically is a closed channel, i. e. it only can be accessed from the opening of the fluid displacement chamber and/or from the port of the second sealing plate. The liquid handling and processing tool further comprises a housing having a plurality of chambers for holding reagents of receiving liquids, with each of these chambers having a top and a bottom. It should be noted that these chambers typically are isolated from each other, unless otherwise specified. Likewise they are also closed chambers in the sense that they are closed, i. e.

hermetically sealed, unless addressed through a fluidic part in their respective bottom and/or, optionally, if present, through a venting port in their respective top. Furthermore, some of the respective chambers may additionally have a loading port in their top through which the respective chamber may be loaded or filled with a desired liquid. If such loading port is present, it is configured to be re-sealed after use, i. e. after a liquid has been added to the respective chamber or has been taken out from the respective chamber, such loading port may be closed again, thus closing the respective chamber. Closing of a loading port may occur by any suitable means such as a cap, seal or plug. Such cap, seal or plug may be individualized for each, respective loading port, or it may be a common seal, ring or cap that closes several ports at the same time. The term "to close" or "closed", as used herein, is used synonymously with "to hermetically seal" and "hermetically sealed", meaning that no liquid, fluid or other matter may be added or taken out, unless through any of the specified ports or openings specifically provided for that purpose. It should also be noted that the channel in the second sealing plate is a closed channel, i. e. liquid can only enter or leave this channel through the opening of said fluid displacement chamber at the bottom, or through the port in said second sealing plate. The channel may be manufactured as a "tunnel" within said second sealing plate, or it may be produced as a groove and subsequently covered by an appropriate cover or lid that is placed onto such groove.

The liquid handling and processing tool for analyzing a biological sample further comprises a housing having a plurality of chambers for holding reagents or receiving liquids, with each of the chambers having a top and a bottom, a fluidic port in the bottom, and, optionally, a venting port in the top. Except for the presence of such port(s) and a further optional loading port in the top, the respective chambers are closed. The housing further includes at least one interface for fluidically connecting a separate fluid processing module to said housing. It should be noted that unless specifically indicated, such separate fluid processing module does not form part of the liquid handling and processing tool according to the present invention. The at least one interface for fluidically connecting a fluid processing module comprises a single port. The term "fluidically connecting", as used herein, is meant to refer to a connection that allows the flow of liquid between the two entities thus connected, without any leakage. Such term is herein sometimes used synonymously with "leak-free" connection.

In the liquid handling and processing tool for analyzing biological sample, the valve body and the housing are arranged in such a manner that the fluid displacement chamber is located within the housing, and the valve body is rotatable within the housing. Depending on the position of the valve body and the respective port(s) in the second sealing plate and the first sealing plate, individual chambers within the plurality of chambers may be addressed by a user, thus allowing the establishment of a connection from the fluid displacement chamber to the respective chamber and thereby allowing the flow of liquid from the fluid displacement chamber to the thus addressed chamber or allowing flow of liquid from the thus addressed chamber to the fluid displacement chamber. Depending on the position and rotation of the valve body within the housing, different chambers may be addressed, i. e. fluidically connected to the fluid displacement chamber. It should be noted, that, typically, at a single time, only a single chamber is fluidically connected to the fluid displacement chamber.

The valve body includes a first sealing plate at top and a second sealing plate at the bottom, and the first sealing plate seals the plurality of chambers at their respective tops, and the second sealing plate seals the plurality of chambers at their respective bottoms.

The first sealing plate of said liquid handling and processing tool seals the plurality of chambers at their respective tops, more specifically the respective venting port(s), if present, of a chamber at the top. The second sealing plate seals the plurality of chambers at their respective bottoms, more specifically, the respective fluidic port(s) in the bottom. The valve body is configured to establish, via said channel and via the port of/in the second sealing plate, a single fluidic connection from the fluid displacement chamber to a selected chamber of the plurality of chambers. The "selected chamber" typically is a chamber that has been selected by a user to be addressed by the valve body, i. e. to be fluidically connected to the fluid displacement chamber. The valve body is also configured to optionally allow the concomitant venting of the same chamber (to which a single fluidic connection has been established via the port of the second sealing plate), or another chamber, via the port of the first sealing plate. Whether or not the same or a different chamber is concomitantly vented depends on the presence of a venting port in the top of the respective chamber and/or the respective alignment of the ports in the second sealing plate at the bottom and the first sealing plate at the top. If the port of the second sealing plate and the port of the first sealing plate are aligned with each other such that they are aligned along the longitudinal axis of the valve body/fluid displacement chamber, it will be a single chamber to which, at the bottom, a single fluidic connection from the fluid displacement chamber is established and which is concomitantly vented. If, however, the port in the second sealing plate and the port in the first sealing plate are offset against each other, such that they are not aligned along the longitudinal axis of the valve body/fluid displacement chamber, then, a single fluidic connection from said fluid displacement chamber to a first chamber of the plurality of chambers is established, and a concomitant venting of another chamber, i. e. second chamber, via the port of the first sealing plate (and the venting port of such second chamber) occurs. Alternatively, if the valve body is in another position, a single fluidic connection from the fluid displacement chamber to said at least one interface may be established. If a separate fluid processing module is attached to such at least one interface, the single fluidic connection will thus also be established to such separate fluid processing module attached to such at least one interface. As used herein, the term "first sealing plate" is sometimes herein also referred to as "top sealing plate". Likewise, the term "second sealing plate" is herein also sometimes referred to as "bottom sealing plate".

In one embodiment, typically, the chambers within the plurality of chambers are arranged adjacent to each other. Individual chambers may be compartmentalized, i. e. be subdivided. As a minimum requirement, each of said plurality of chambers has a fluidic port in its bottom and, optionally, a venting port in its top. In some embodiments, a chamber may have more than one fluidic port in its bottom and no venting port, one venting port or more than one venting port in its top. In one embodiment, each chamber has precisely one fluidic port in its bottom and precisely one venting port in its top. In some embodiments, depending on its respective function, a chamber of said plurality of chambers may have functional parts inside, such as a filter etc.

In one embodiment, the housing and the valve body have a circular cross section. Preferably, the chambers of the plurality of chambers are arranged adjacent to each other and preferably around the centrally located fluid displacement chamber. Preferably, in such an embodiment, the chambers are arranged adjacent to each other like adjacent segments of a circle or adjacent pieces of a circular pie.

In some embodiments, adjacent chambers may be fluidically connected to each other. As an example, the adjacent chambers may be fluidically connected to each other, and each of said three chambers may have a fluidic port in the respective bottom and a venting port in the respective top. A fluidic connection between the adjacent chambers may be a respective opening in the wall(s) between adjacent chambers. As an example, the first chamber may contain a filter element that may serve for enriching a particular analyte, such as nucleic acids from a lysed sample, and may contain a high salt buffer. A lysed sample may be applied to the first chamber via the first fluidic port at the bottom. The liquid may be moved over the filter several times bidirectionally, because excess liquid can be moved to the second chamber that is adjacent to the first chamber through the opening in the wall between the two chambers. Such second chamber acts as a post-filter liquid trapping chamber. If the applied volume of lysed liquid sample exceeds also the volume of the post-filter liquid trapping chamber, the liquid may be moved into the third chamber, again via a fluidic connection, e. g. an opening between the second and the third chamber, and such third chamber acts as an overflow chamber. Different liquids can be applied to the second chamber through its fluidic port at the bottom. Such liquid applied through the fluidic port at the bottom of the second chamber may, however, also be pulled through the filter within the first chamber, for example for washing or eluting the material bound to the filter, by adjusting the valve body to the fluidic port of the first chamber and applying a negative pressure, thus drawing the liquid contained in the second chamber into the first chamber and through the filter. Thus, complex work flows can be accommodated by combining dedicated adjacent chambers with different functions or by combining specific chambers together with adjacent interfaces for attaching external modules, such as will be described further below as well.

It should be noted that such embodiment may also be realized by subdividing a single chamber into three adjacent compartments with each compartment having its own fluidic port at the bottom and its own venting port at the top and with the three compartments being in fluidic connection with each other. In any case, it should be noted, however, that other than for the presence of fluidic ports, venting ports and fluidic connections between the chambers or compartments, the respective chambers or compartments are still closed.

As used herein, the term "liquid handling and processing tool" is used interchangeably and synonymously with the term "cartridge for analyzing a biological sample". The cartridge or liquid handling and processing tool according to the present invention, as described herein, is a "ready-to-fill" cartridge and can be easily manipulated and handled even after it has been filled and equipped with the appropriate and intended reagents.

In one embodiment, the ports of the first sealing plate and the second sealing plate are aligned with each other along a longitudinal axis of the valve body. Preferably, the longitudinal axis of the valve body is also the longitudinal axis of the fluid displacement chamber. Preferably, the fluid displacement chamber has a piston (herein also sometimes referred to as a "plunger") that is moveable within the fluid displacement chamber and that allows to draw liquid to and expel liquid from the fluid displacement chamber. The fluid displacement chamber is centrally located within the valve body and aligned along the longitudinal axis of the valve body. Preferably, the valve body further includes a first circular sealing plate located at the top of the fluid displacement chamber, and a second circular sealing plate located at the bottom of the fluid displacement chamber. The first circular sealing plate and the second circular sealing plate are fixedly connected to the valve body at the top and bottom of the fluid displacement chamber, respectively. The first circular sealing plate has a venting port located off-center of the first circular sealing plate, and the second circular sealing plate has a fluidic port located off-center of said second circular sealing plate. In one embodiment, at least one chamber of the plurality of chambers has a venting port and its top, wherein, preferably, each of the plurality of chambers have a venting port at their respective tops.

As pointed out above, in said plurality of chambers, each chamber is closed, meaning that except for the presence of a fluidic port in the bottom and, optionally, a further port (venting port) in the top and further optionally, an additional opening or loading port in the top, of the respective chamber, such chamber(s) is (are) closed, and no matter, such as liquid, fluid or other agents can be added to or taken from such chamber. In one embodiment, the plurality of chambers are closed at the top by a single lid in which any venting port(s), if present, is (are) located.

In one embodiment, at least one chamber of said plurality of chambers further has a loading port for adding liquids to said chamber, such loading port being located at the top of said at least one chamber, wherein said loading port is different from said venting port, if present. It should be noted, that such loading port, if present, is closable/sealable, preferably by a suitable cap or plug or lid or seal. This allows to add a reagent or liquid or other substance to a particular chamber and thereafter close it again.

In one embodiment, several chambers, preferably all chambers, of said plurality of chambers, each have a loading port for adding liquids or other substances to the respective chamber, said loading ports being located at the top of the respective chamber(s), said loading ports being different from any venting port(s), if present. In a preferred embodiment, said loading port(s) is (are) located in the single lid that closes the plurality of chambers at the top.

In one embodiment, the housing includes several interfaces for fluidically connecting a separate fluid processing module to said housing, each of said several interfaces comprising a single port.

In one embodiment, at least one chamber is a compartmentalized chamber having different compartments which are in fluidic connection with each other, such compartments being configured to perform different functions, such as filtering, acting as a reservoir for processing fluids, or for acting as an overflow volume. In another embodiment, at least two chambers of said plurality of chambers, or possibly more chambers, such as three, four, five or more chambers, are in fluidic connection with each other, with each of such at least two chambers being configured to perform the different functions, such as filtering, acting as a reservoir for processing fluids or acting as an overflow volume, wherein preferably, said at least two chambers being in fluidic connection with each other, each have a fluidic port in the bottom and a venting port in the top. In one embodiment, one, some or all of such chambers also have a loading port in their respective top.

As pointed out above, the channel in said sealing plate allows the valve body to establish a single fluidic connection from said fluid displacement chamber to a selected chamber of the plurality of chambers, or to at least one interface, as mentioned above. Such channel has no other openings than the opening of the fluid displacement chamber at the bottom and the port of said second sealing plate, but is otherwise a closed channel. The channel may be configured to be a tunnel within the second sealing plate or maybe a groove within the second sealing plate that is covered by an additional cover or lid on top of said groove.

In one embodiment, said at least one interface has a port for fluidically connecting an external module to said housing, such as an external fluid processing module, and said single port is not part of any of said plurality of chambers, but is configured to allow the attachment of an external module, such as a fluid processing module or other module, from the outside to the housing. Thus, because such single port is not located in any of the (closed) chambers, it can be accessed and reached from the outside and allows such external attachment.

Sealing of said plurality of chambers by said first and second sealing plates is preferably achieved by employing suitable sealing material(s) placed between the respective plate(s) and the housing and/or by lining said first and second sealing plates and/or the housing with such suitable sealing materials and/or by configuring said first and said second sealing plates and the housings such that the respective sealing plates is/are pressed against the housing with a force that is sufficient to seal the plurality of chambers, wherein preferably, said suitable sealing material(s) is(are) selected from elastic materials, thermoplastic materials and other plastic materials.

It should be noted that the liquid handling and processing tool (i. e. cartridge) is made from a suitable plastic material and can be manufactured by appropriate manufacturing techniques known to a person skilled in the art, such as molding techniques, extrusion techniques, three-dimensional printing techniques and others and combinations of the foregoing.

In one embodiment, the channel in the second sealing plate is configured to be interrogated with any of:
a) an optical setup capable of detecting the presence, volume and/or optical properties of any fluid in the channel;
b) a pressure sensor to determine pressure within said liquid handling and processing tool, preferably within said channel.

In one embodiment, such optical setup is a reflective optical setup, such as a light barrier, and/or body pressure sensor is a piezo-based pressure sensor.

In one embodiment, the liquid handling and processing tool further comprises at least one fluid processing module that is attached to said at least one interface via said single port of said at least one interface or, if present, to several such interfaces. In the latter case, if the at least one fluid processing module is attached to several such interfaces, such interfaces are typically located adjacent to each other.

In one embodiment, the fluid processing module attached to said at least one interface via aid single port is a module configured for performing a nucleic acid amplification reaction, or is a module configured for concentrating or purifying an analyte of interest, such as a nucleic acid, or is a module for disrupting, homogenizing and/or lysing a biological sample. In one embodiment, said module for disrupting, homogenizing and/or lysing a biological sample comprises a chamber including a grinding medium comprising beads or balls that are configured to be agitated from outside the module.

In one embodiment, where the fluid processing module is a module configured for concentrating or purifying an analyte of interest, such module is chamber including a suitable medium having an affinity for the analyte of interest.

In one embodiment, where the fluid processing module is a module configured for performing a nucleic acid amplification reaction, such nucleic acid amplification module has an opening by which it is fluidically connected to the single port of said interface. Preferably, such opening is the only opening of such fluid processing module.

In one embodiment, said fluid processing module comprises a frame encompassing a volume having at least one wall that is flexible and conformable to an external temperature regulating surface.

In one embodiment, said fluid processing module further comprises a rigid wall region that is transparent or otherwise amenable to optical interrogation by means of an external optical sensor, such that said fluid processing module is configured to allow detection of a content within said fluid processing module.

In one embodiment, the fluid processing module comprises a frame encompassing a volume having at least one wall that is flexible and conformable to an external temperature regulating surface. In one embodiment, said fluid processing module further comprises a rigid wall region that is transparent or otherwise amenable to optical interrogation by means of an external optical sensor, such that said fluid processing module is configured to allow detection of a content within said fluid processing module. In one embodiment, where the frame encompasses a volume having at least one wall that is flexible and conformable to an external temperature regulating surface and wherein the fluid processing module further comprises a rigid wall region that is transparent or otherwise amenable to optical interrogation, such flexible wall and such rigid wall region are located opposite of each other.

In one embodiment, the fluid processing module has a bipartite volume consisting of a first part and a second part, wherein the first part is a first volume directly connected and in communication with said opening of said fluid processing module. In such said first volume, processing of sample and, optionally, detection of a processing reaction takes place. The second part is a second volume that is only connected to said first part via a connecting tube, but is an otherwise closed volume. Such said second volume is a volume for receiving overflow of liquid or gas (i. e. of fluid) from the first part and for acting as a pressure reservoir.

In one embodiment, said first volume of two opposing walls, one of which is formed by the aforementioned flexible wall, or by a part thereof, and the other one of which is formed by the aforementioned rigid wall region, or by a part thereof. It should be noted that in embodiments, typically, said rigid wall region is not an integral part of said frame and is detachable therefrom. In such typical embodiment(s), the rigid wall region is a part that is manufactured separately from said frame and is a separate part that can be attached to said frame, for example by clipping, gluing or otherwise connecting it to said frame.

In one embodiment, at least one chamber of said plurality of chambers has an external wall that is accessible from the outside of the housing, and such external wall is configured to be contacted by a temperature regulating device (preferably not forming part of the liquid handling and processing tool, but being provided from the outside), thus allowing temperature control within said at least one chamber, if and when a temperature regulating device does contact such external wall.

In a further aspect, the present invention also relates to a fluid processing and detection module for processing a liquid sample and for detecting an analyte in said sample, such fluid processing and detection module being configured to be used in conjunction with a liquid handling and processing tool, as defined above, i. e. to be configured to be used in conjunction with a cartridge, as defined above. Such fluid processing and detection module is configured to be attached to said at least one interface of said liquid handling and processing tool via said single port of said at least one interface. The fluid processing and detection module comprises:

a frame encompassing a volume having at least one wall that is flexible and conformable to an external temperature regulating surface;

a rigid wall region that is transparent or otherwise amenable to optical interrogation by means of an external optical sensor; wherein, preferably, said rigid wall region is detachable from said frame and is not an integral part of said frame;

an opening by which said fluid processing and detection module is fluidically connectable to said single port of said interface of said liquid handling and processing tool, wherein, preferably, said opening of said fluid processing and detection module is the only opening of said module.

It should be noted that such "fluid processing and detection module for processing a liquid sample and for detecting an analyte in said sample" is also herein sometimes referred to as a "nucleic acid amplification module", because it is configured to perform a nucleic acid amplification reaction.

It should be noted that in embodiments, typically, said rigid wall region is not an integral part of said frame and is detachable therefrom. In such typical embodiment(s), the rigid wall region is a part that is manufactured separately from said frame and is a separate part that can be attached to said frame, for example by clipping, gluing or otherwise connecting it to said frame.

In one embodiment, such fluid processing and detection module comprises a bipartite volume consisting of a first part and a second part, wherein the first part is a first volume directly connected and in communication with said opening of said fluid processing and detection module, wherein in said first part, the processing of sample and detection of any processing reaction takes place, such as a nucleic acid amplification reaction and wherein the second part is a second volume connected only to said first part via a connecting tube, but being otherwise a closed volume, wherein said second part is a volume for receiving overflow of liquid or gas from the first part and for acting as a pressure reservoir.

In one embodiment, said first volume has two opposing walls, one of which is formed by the flexible wall, as defined above, or by a part thereof, and the other of which is formed by the rigid wall region, as defined above, or by a part thereof.

The invention is now further described by reference to the following figures which are exemplarily given to illustrate, not to limit the present invention.

FIG. 1 shows an explosion view of an embodiment of a liquid handling and processing tool in accordance with the present invention wherein said tool comprises a housing, having a plurality of chambers. The chambers can be equipped with fluidic ports at their bottom and venting ports at their top. The chambers are formed by attaching a lid onto the housing. The lid is equipped with openings (=ports or venting ports) that are reversibly sealed by the first sealing plate. The first sealing plate has at least one port that, by rotating the valve body, and thus the first sealing plate attached to it, can brought into contact with any of the openings (=ports of the individual chambers) in the lid. The valve body is positioned centrally within the housing. The valve body is comprised of a fluid displacement chamber with a plunger (or piston), similar to a syringe, and a second sealing plate equipped with a fluidic channel connecting the fluid displacement chamber with a port on the second sealing plate. The fluidic channel is formed by attaching a lid onto a groove within that second sealing plate (see also FIGS. 7b, 8b and 10). The first and second sealing plates are fixedly connected to the valve body.

Once assembled, the valve body and the first and second sealing plates comprise a single mechanical component that facilitates sealing of the chambers in the housing and provide for deliberate fluidic access to the respective chambers through the fluidic port on the second sealing plate and for ventilation of the chamber through the port on the first sealing plate.

The housing also features one or several interfaces for connecting external fluid processing modules, each of such interfaces comprising a single port.

FIG. 2 shows an explosion view of an embodiment of a liquid handling and processing tool in accordance with the present invention wherein said tool further comprises an additional opening (loading port) in the housing lid which opening is not sealed by the first sealing plate. Such openings may be useful for adding materials, such as samples to be processed, after the liquid handling and processing tool has been assembled, and are therefore also sometimes referred to herein as "loading ports". A separate cap is provided for sealing such additional openings. A filter may be attached to the venting port in the first sealing plate in order to prevent the exit of any liquids or solid materials from the addressed chamber and to ensure ventilation of the respective chamber. The drawing exemplary shows two external fluid processing modules to be attached to ports on the housing allowing for attachment of such external modules. One fluid processing module is shown with one connector to a single port on housing and the other fluid processing module connecting to two separate ports on housing.

Figure 6:
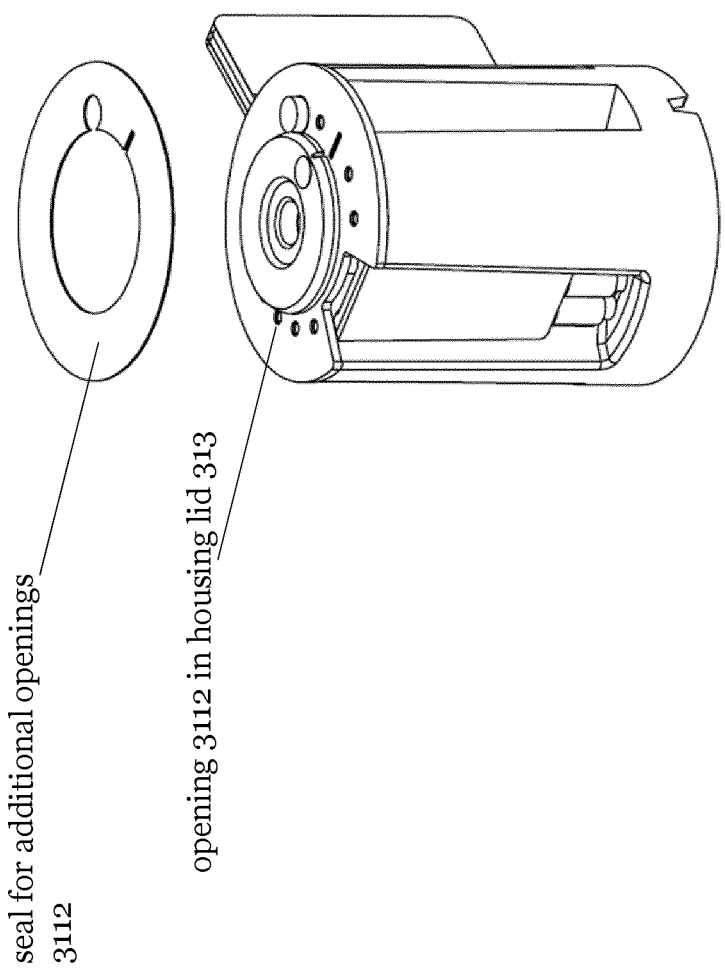

FIG. 6 shows the assembled liquid handling and processing tool with a modified housing lid equipped with additional openings (loading ports). Such openings are useful for adding liquid or solid reagents to the liquid handling and processing tool after it has been mechanically assembled. In order to still provide for complete sealing of the chambers with the respective reagents an additional seal is provided that is placed onto the openings (loading ports) outside of the first sealing plate. Such seals can be attached to the housing by different means, e.g. adhesive layers, chemical or solvent bonding, laser or ultrasonic welding techniques.

Figure 5:
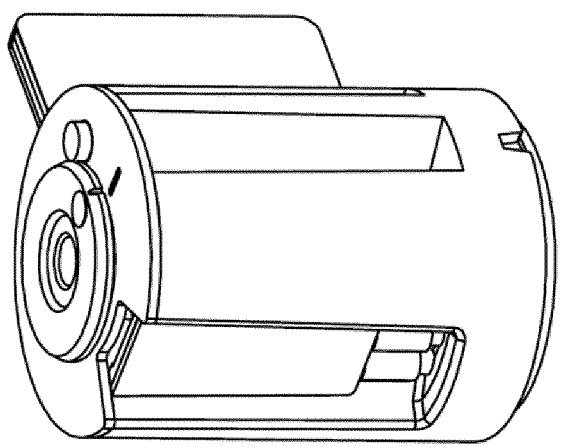
FIG. 5 shows the liquid handling and processing tool with two external fluid processing modules attached to the assembled liquid handling and processing tool.
Figure 7B:
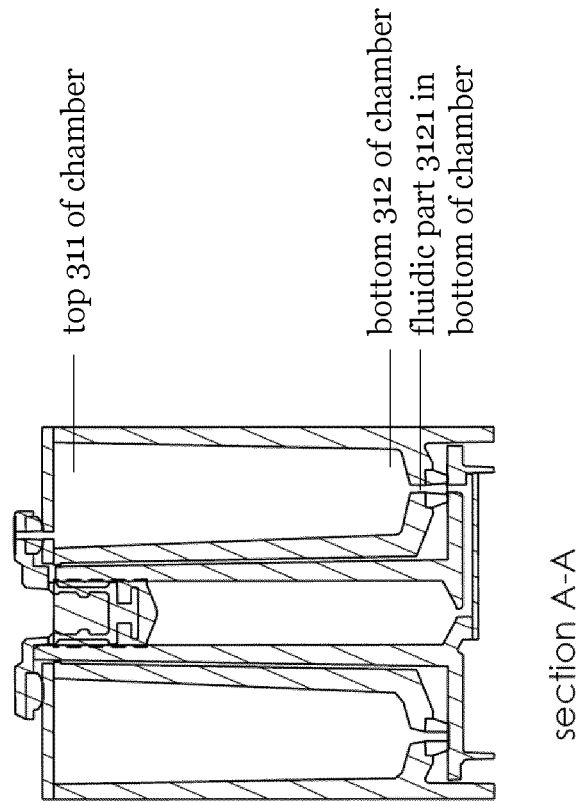
Figure 7A:
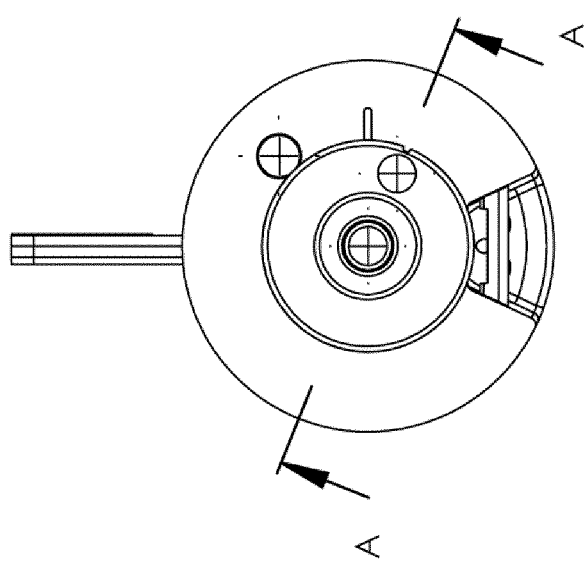

FIG. 7a shows the top view of the assembled liquid handling and processing tool with two external fluid processing modules attached of FIGS. 5 and 6. FIG. 7b shows the cross-section drawn along the A-A line indicated in FIG. 7a. Whereas the left chamber is isolated and sealed, the chamber on the right is in fluid connection with the fluid displacement chamber through the channel at the bottom of the second sealing plate. The right chamber also features an opening (venting port) in its top lid. This opening is aligned and connected to the port in the first sealing plate, thus the chamber is ventilated.

Figure 1:
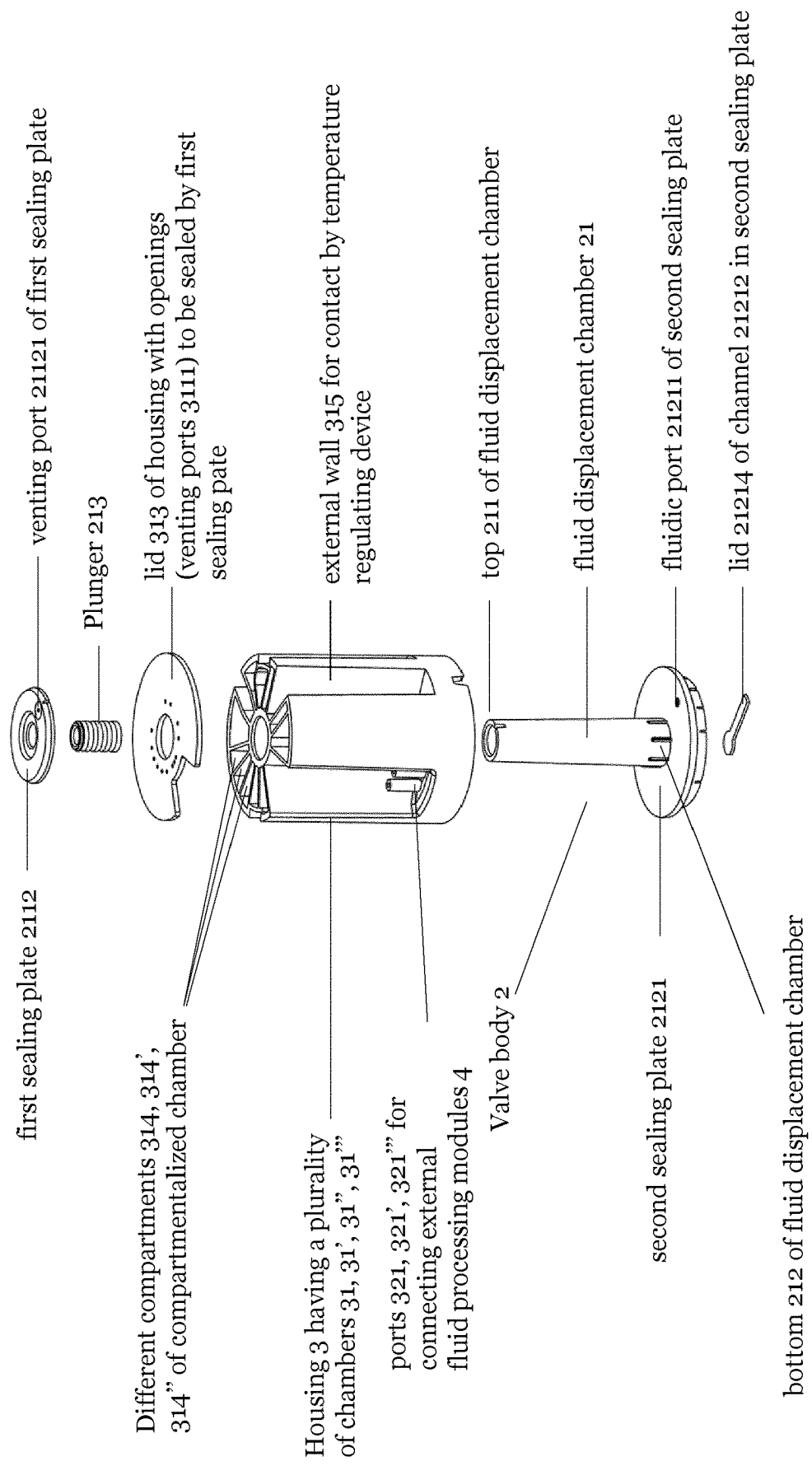
Figure 2:
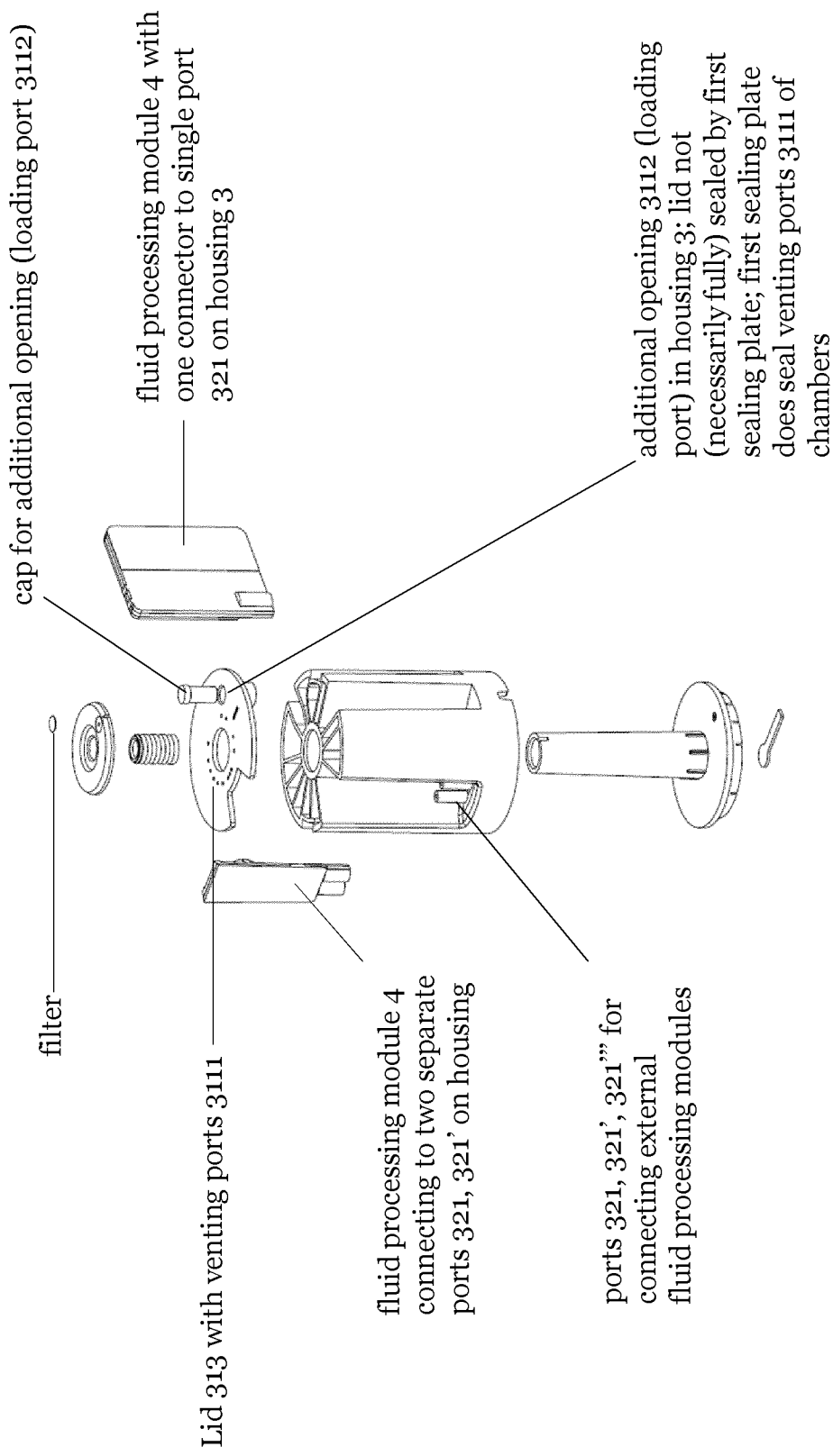
Figure 3:
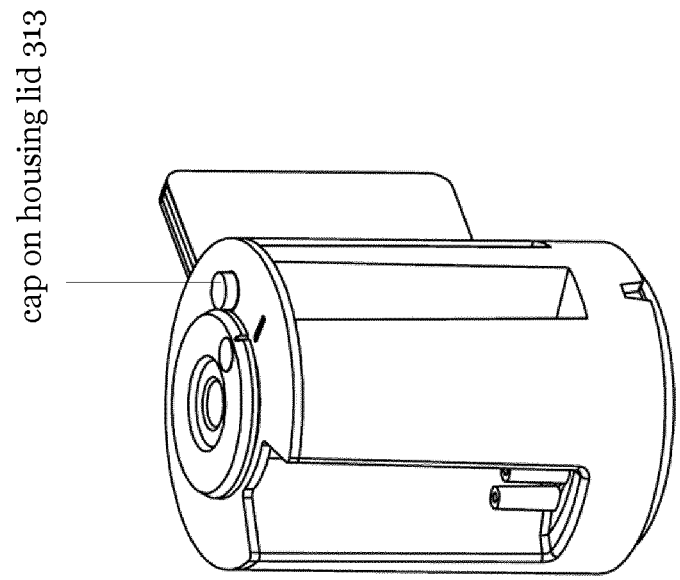
FIG. 3 shows an assembled liquid handling and processing tool with one external module attached to it and capped opening (loading port) in its housing lid.
Figure 4:
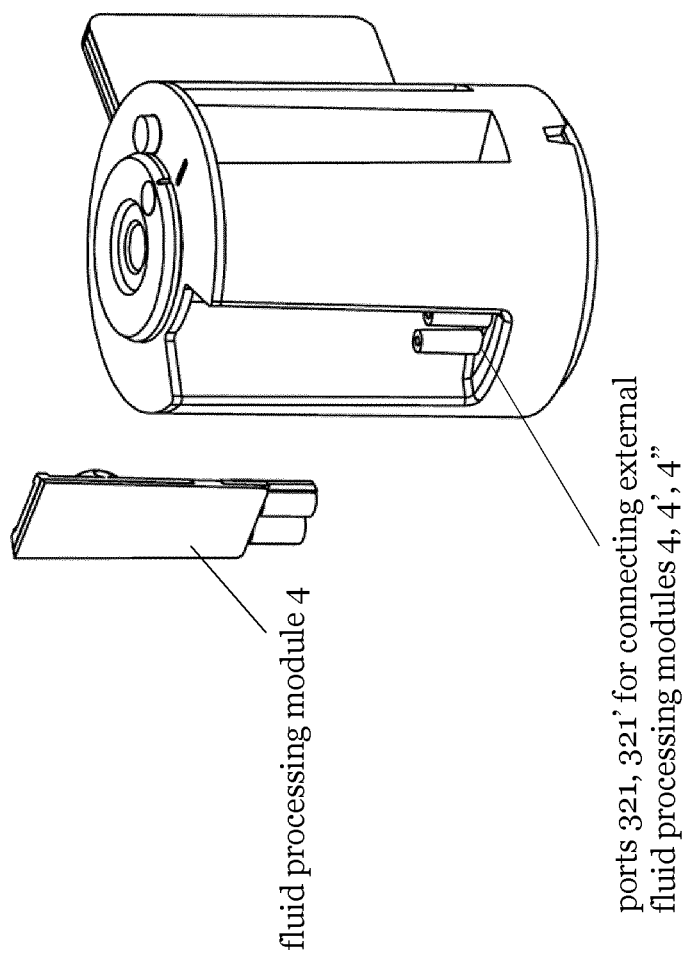
FIG. 4 shows how additional fluid processing modules can be attached to the assembled liquid handling and processing tool by simply connecting such external modules with the respective interface(s) on the housing, having the corresponding port(s) required for such connection.
Figure 8B:
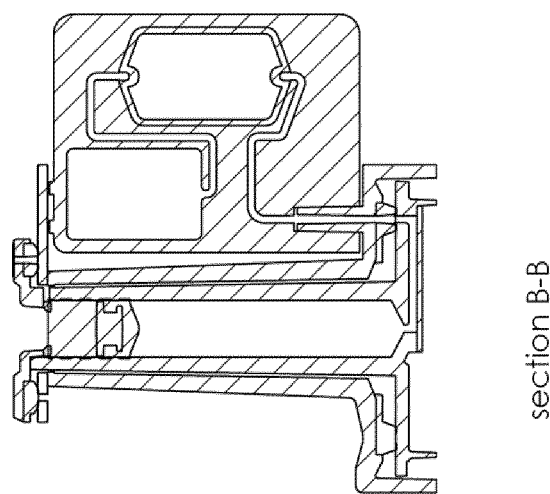
Figure 8A:
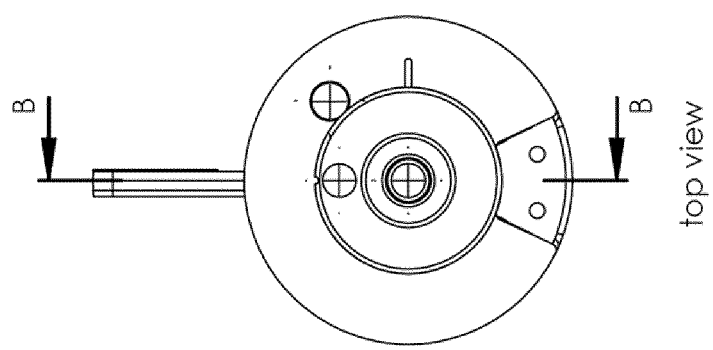

FIG. 8a shows the top view of the assembled liquid handling and processing tool of FIG. 3 with one external fluid processing module attached and two ports available for attaching further external fluid processing modules. FIG. 8b shows the cross-section drawn along the B-B line indicated in FIG. 8a. Whereas on the left the housing provides for open space to fit additional external modules, on the right an external module attached to the housing through a single port is shown. The module is fluidically connected through the port in the second sealing plate, but is not ventilated (no venting port in the top).

FIGS. 9a-9b show the design of the external module attached to the liquid handling and processing tool in FIG. 8. FIG. 9a shows an explosion view of such an external fluid processing module that is attached to the housing via a single port. The shown module is configured for performing a nucleic acid amplification reaction. The module comprises a frame with two walls attached to the frame. One wall is flexible and conformable to an external temperature regulating surface; the second wall is rigid and transparent in order to facilitate optical interrogation of the (bio-)chemical reaction within the chamber. FIG. 9b shows that the design comprises a bipartite volume consisting of a first part and a second part, wherein the first part is a first volume directly connected and in communication with a port of the fluid processing and detection module. In this first part, processing of sample and detection of any processing reaction takes place. The second part is a second volume connected only to the first part via a connecting tube, but represents otherwise a closed volume for receiving overflow of liquid or gas from the first part and for acting as a pressure reservoir.

Figure 10:
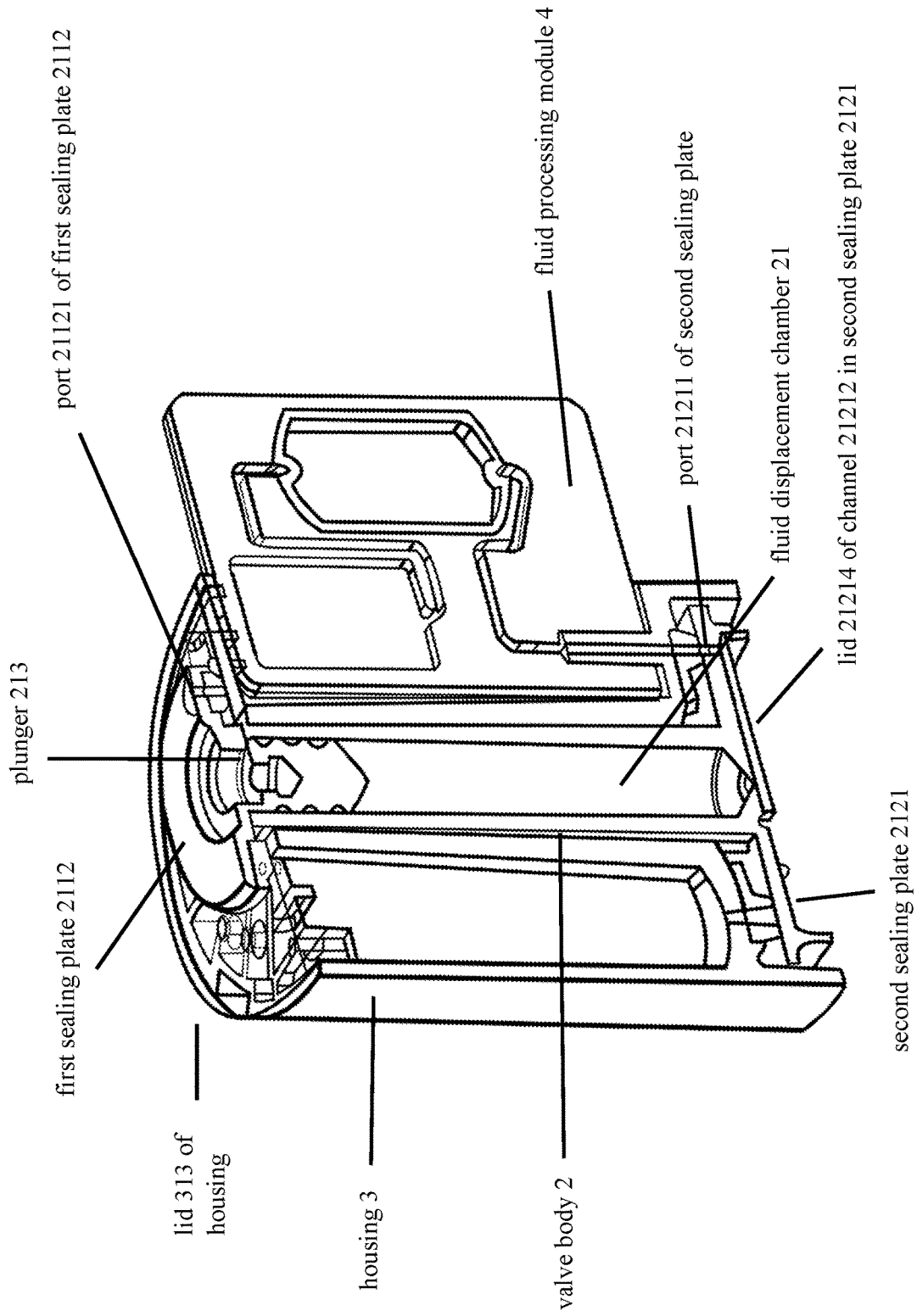

FIG. 10 shows a cross section of a three dimensional figure of the liquid handling and processing tool with an attached external fluid processing module.

LIST OF REFERENCE NUMERALS

1 Liquid handling and processing tool or cartridge
2 Valve body
21 Fluid displacement chamber having a
211 top (of fluid displacement chamber) and a
212 bottom (of fluid displacement chamber) and an
2111 opening at said top and an
2121 opening at said bottom
2112 First sealing plate at the top of fluid displacement chamber (=top sealing plate/first circular sealing plate)
2121 Second sealing plate at the bottom of fluid displacement chamber (=bottom sealing plate/second circular sealing plate)
21121 Port of first sealing plate (=venting port located off-centre of said first sealing plate)
21122 opening in said first sealing plate
21211 Port of second sealing plate (=fluidic port located off-centre of said second sealing plate)
21212 Channel in second sealing plate extending radially from
21213 opening in said second sealing plate and ending in said 21211 fluidic port of said second sealing plate
21214 lid of channel
213 piston/plunger of said fluid displacement chamber
3 Housing having a plurality of
31, 31', 31", 31''', . . . chambers for holding reagent(s) or receiving liquid(s), each of said chambers having a
311 top (of chambers) and a
312 bottom (of chambers)
3121 fluidic port at the bottom (of each chamber)
3111 venting port at the top (of chamber(s))
32 at least one interface for fluidically connecting a separate fluid processing module to said housing
321 single port (of said at least one interface)
3112 loading port (of at least one chamber) for adding liquids to said chamber, said loading port being located at the top of said at least one chamber
313 single lid closing said plurality of chambers at the top
3111 venting port(s) in single lid
314, 314', 314" compartments of compartmentalized chamber which are in fluidic connection with each other, such compartments being configured to perform different functions
315 external wall of chamber accessible from the outside of said housing
4 fluid processing module that is attached to said at least one interface via said single port of said at least one interface or, if present, to several such interfaces
41 opening of fluid processing module by which it is fluidically connected to said single port of said interface
42 frame of fluid processing module encompassing a
421 volume having at least
4211 one wall that is flexible and conformable to an external temperature regulating surface;
4212 a rigid wall region that is transparent or otherwise amenable to optical interrogation by means of an external optical sensor

The invention claimed is:

1. A liquid handling and processing tool for analyzing a biological sample, said tool comprising:
  a) a valve body having a longitudinal axis and including, along its longitudinal axis, a fluid displacement chamber, said fluid displacement chamber having a top and a bottom, and an opening at said top and said bottom, respectively;
  said fluid displacement chamber further having a piston movable within said fluid displacement chamber and that is configured to draw liquid to and expel liquid from said fluid displacement chamber;
  said fluid displacement chamber being centrally located within said valve body and aligned along said longitudinal axis of said valve body;
  said valve body further including a first circular sealing plate located at the top of the fluid displacement chamber, and a second circular sealing plate located at the bottom of the fluid displacement chamber;
  said first circular sealing plate being fixedly connected to said valve body at the top of the fluid displacement chamber and having a venting port located off-centre of said first circular sealing plate, said first circular sealing plate configured to allow access to said opening of said fluid displacement chamber at said top by means of an opening;
  said second circular sealing plate being fixedly connected to said valve body at the bottom of the fluid displacement chamber and having a fluidic port located off-centre of said second circular sealing plate, said second circular sealing plate configured to allow access to said opening of said fluid displacement chamber at said bottom by means of an opening;

said venting port of said first circular sealing plate and said fluidic port of said second circular sealing plate being aligned with each other; said second circular sealing plate further having a channel extending radially from said opening within said second circular sealing plate and ending in said fluidic port located off-centre of said second circular sealing plate; said valve body thus being configured to establish, via said channel, a single fluidic connection with said fluidic port located off-centre of said second circular sealing plate;

b) a housing including a plurality of chambers for holding reagent(s) or receiving liquid(s), said chambers being arranged around a central hollow space, each of said chambers having a top and a bottom, respectively;
a fluidic port in said bottom and, optionally, a venting port in said top; said housing further including at least one interface for fluidically connecting a separate fluid processing module to said housing, said at least one interface comprising a single port;

wherein said single port of said at least one interface for fluidically connecting a fluid processing module to said housing, is not part of any of said plurality of chambers and is configured to allow the attachment of a fluid processing module from outside the housing;

wherein the valve body and the housing are arranged in such a manner that said fluid displacement chamber is located within said central hollow space, the valve body is rotatable within said central hollow space around said longitudinal axis, the first circular sealing plate of said valve body seals said plurality of chambers at their respective tops, the second circular sealing plate of said valve body seals said plurality of chambers at their respective bottoms; and the valve body is configured to establish, via said channel and via the fluidic port in the bottom of said second circular sealing plate, a single fluidic connection from said fluid displacement chamber to a selected chamber of the plurality of chambers, and, optionally, to allow the concomitant venting of the same or another chamber via the venting port of said first circular sealing plate; or the valve body is configured to establish a single fluidic connection, via said channel and via the fluidic port in the bottom of said second circular sealing plate, from said fluid displacement chamber to said at least one interface and, if present, any separate fluid processing module attached to such interface;

said liquid handling and processing tool further comprising at least one fluid processing and detection module for processing a liquid sample and for detecting an analyte in said sample, said fluid processing and detection module being configured to be used in conjunction with said liquid handling and processing tool, and furthermore, configured to be attached to said at least one interface of said liquid handling and processing tool via said single port of said at least one interface, wherein said fluid processing and detection module comprises:
a frame encompassing a volume having at least one wall that is flexible and conformable to an external temperature regulating surface; a rigid wall region that is transparent or otherwise amenable to optical interrogation by means of an external optical sensor; wherein said rigid wall region is detachable from said frame and is not an integral part of said frame;
an opening by which said fluid processing and detection module is fluidically connectable to said single port of said interface of said liquid handling and processing tool, wherein said opening of said fluid processing and detection module is the only opening of said fluid processing and detection module;
wherein said fluid processing and detection module has a bipartite volume consisting of a first part and a second part, wherein the first part is a first volume directly connected and in communication with said opening of said fluid processing and detection module, wherein in said first volume, processing of sample and detection of a processing reaction takes place, and wherein the second part is a second volume that is only connected to said first part via a connecting tube, but is an otherwise closed volume, wherein said second volume is a volume for receiving overflow of liquid or gas from the first part and is configured to act as a pressure reservoir.

2. The liquid handling and processing tool according to claim 1, wherein the ports of said first sealing plate and said second sealing plate are aligned with each other along a longitudinal axis of said valve body.

3. The liquid handling and processing tool according to claim 1, wherein at least one chamber of said plurality of chambers has a venting port at its top, wherein each of said plurality of chambers has a venting port at its respective top.

4. The liquid handling and processing tool according to claim 1, wherein said plurality of chambers are closed at the top by a single lid in which any venting port(s), if present, is (are) located.

5. The liquid handling and processing tool according to claim 1, wherein at least one chamber of said plurality of chambers further has a loading port for adding liquids to said chamber, said loading port being located at the top of said at least one chamber, wherein said loading port is different from said venting port, if present.

6. The liquid handling and processing tool according to claim 1, wherein several chambers, each have a loading port for adding liquids to the respective chamber, said loading ports being located at the top of the respective chamber(s), said loading ports being different from any venting port(s), if present.

7. The liquid handling and processing tool according to claim 4, wherein said loading port(s) is (are) located in the single lid.

8. The liquid handling and processing tool according to claim 1, wherein said housing includes several interfaces for fluidically connecting a separate fluid processing module to said housing, each of said several interfaces comprising a single port.

9. The liquid handling and processing tool according to claim 1, wherein at least one chamber is a compartmentalized chamber having different compartments which are in fluidic connection with each other, such compartments being configured to perform different functions; or wherein at least two chambers of said plurality of chambers are in fluidic connection with each other, with each of such at least two chambers being configured to perform different functions.

10. The liquid handling and processing tool according to claim 1, wherein said channel has no other openings than the opening of said fluid displacement chamber at the bottom and said port of said second sealing plate, but is otherwise a closed channel.

11. The liquid handling and processing tool according to claim 1, wherein sealing of said plurality of chambers by said first and second sealing plates is achieved by employing suitable sealing material(s) placed between the respective plate(s) and the housing, and/or by lining said first and second sealing plates and/or the housing with such suitable sealing materials, and/or by configuring said first and second sealing plates and the housing such that the respective sealing plates are pressed against the housing with a force that is sufficient to seal said plurality of chambers.

12. The liquid handling and processing tool according to claim 1, wherein said channel in said second plate is configured to be interrogated with any of:
   a) an optical setup capable of detecting the presence, volume and/or optical properties of any fluid in the channel,
   b) a pressure sensor to determine the pressure within said liquid handling and processing tool.

13. The liquid handling and processing tool according to claim 1, wherein said first volume of said fluid processing and detection module has two opposing walls, one of which is formed by said flexible wall or a part thereof, and the other of which is formed by said rigid wall region or a part thereof.

14. The liquid handling and processing tool according to claim 1, wherein said at least one chamber of said plurality of chambers has an external wall accessible from the outside of said housing, wherein said external wall is configured to be contacted by a temperature regulating device, thus allowing temperature control within said at least one chamber, if a temperature regulating device does contact said external wall.

15. A fluid processing and detection module for processing a liquid sample and for detecting an analyte in said sample, configured to be used in conjunction with a liquid handling and processing tool as defined in claim 1, and configured to be attached to said at least one interface of said liquid handling and processing tool via said single port of said at least one interface, wherein said fluid processing module comprises:
   a frame encompassing a volume having at least one wall that is flexible and conformable to an external temperature regulating surface;
   a rigid wall region that is transparent or otherwise amenable to optical interrogation by means of an external optical sensor; wherein said rigid wall region is detachable from said frame and is not an integral part of said frame;
   an opening by which said fluid processing and detection module is fluidically connectable to said single port of said interface of said liquid handling and processing tool, whereinsaid opening of said fluid processing and detection module is the only opening of said module;
   wherein said fluid processing module comprises a bipartite volume consisting of a first part and a second part, wherein the first part is a first volume directly connected and in communication with said opening of said fluid processing module, wherein in said first volume, processing of sample and detection of any processing reaction takes place, and wherein the second part is a second volume that is only connected to said first part via a connecting tube, but is an otherwise closed volume, wherein said second volume is a volume for receiving overflow of liquid or gas from the first part and for acting as a pressure reservoir.

16. The fluid processing and detection module according to claim 15, wherein, said first volume has two opposing walls, one of which is formed by said flexible wall of claim 15 or a part thereof, and the other of which is formed by said rigid wall region of claim 15 or a part thereof.

17. The liquid handling and processing tool according to claim 1, wherein said opening in said first circular sealing plate is a central opening, within said first circular sealing plate that is aligned with said opening at said top of said fluid displacement chamber, and wherein said opening in said second circular sealing plate is a central opening, within said second circular sealing plate that is aligned with said opening at said bottom of said fluid displacement chamber.

18. The liquid handling and processing tool according to claim 6, wherein all chambers of said plurality of chambers have a loading port for adding liquids to the respective chamber, said loading ports being located at the top of the respective chamber(s), said loading ports being different from any venting port(s), if present.

19. The liquid handling and processing tool according to claim 9, wherein said at least two chambers are in fluidie connection with each other, each have a fluidic port in the bottom and a venting port in the top.

20. The liquid handling and processing tool according to claim 1, wherein said suitable scaling material(s) is (are) selected from elastie materials, thermoplastic materials and other plastic materials.

* * * * *